United States Patent
Kato et al.

(10) Patent No.: US 9,148,015 B2
(45) Date of Patent: Sep. 29, 2015

(54) PROTECTION CIRCUIT

(71) Applicant: Kabushiki Kaisha Toshiba, Tokyo (JP)

(72) Inventors: Kazuhiro Kato, Kanagawa (JP);
Takehito Ikimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 13 days.

(21) Appl. No.: 13/911,383

(22) Filed: Jun. 6, 2013

(65) Prior Publication Data

US 2014/0111893 A1    Apr. 24, 2014

(30) Foreign Application Priority Data

Oct. 24, 2012 (JP) .................. P2012-234621

(51) Int. Cl.
*H02H 9/04* (2006.01)
(52) U.S. Cl.
CPC ..................... *H02H 9/046* (2013.01)
(58) Field of Classification Search
USPC ........................................... 361/56
See application file for complete search history.

(56) References Cited

U.S. PATENT DOCUMENTS

| | | | | |
|---|---|---|---|---|
| 5,745,323 A * | 4/1998 | English et al. | .................. | 361/56 |
| 7,280,332 B2 * | 10/2007 | Ma et al. | ...................... | 361/91.1 |
| 7,821,752 B2 * | 10/2010 | Choi | ................................ | 361/56 |
| 8,345,396 B2 * | 1/2013 | Wang et al. | ..................... | 361/58 |
| 8,633,543 B2 * | 1/2014 | Ohta et al. | ..................... | 257/355 |
| 2009/0268360 A1 | 10/2009 | Shinomiya et al. | | |

FOREIGN PATENT DOCUMENTS

| | | |
|---|---|---|
| JP | 2009-267072 A | 12/2009 |
| JP | 2010186954 A | 8/2010 |
| JP | 2011103483 A | 5/2011 |

* cited by examiner

*Primary Examiner* — Dharti Patel
(74) *Attorney, Agent, or Firm* — Patterson & Sheridan, LLP

(57) ABSTRACT

A circuit that protects against ESD and avoids an excessive power voltage drop during the protection operation includes a control circuit that is connected between power terminals and outputs a control signal when a voltage between the power terminals exceeds a predetermined value due to a surge current, and an asymmetric current transfer device including a PN junction reverse-biased by the power voltage between the power terminals, that is connected in series with the output current channel of a shunt transistor. The conductivity of the shunt transistor is controlled according to the control signal.

19 Claims, 4 Drawing Sheets

PROTECTION CIRCUIT

CROSS-REFERENCE TO RELATED APPLICATION

This application is based upon and claims the benefit of priority from Japanese Patent Application No. 2012-234621, filed Oct. 24, 2012, the entire contents of which are incorporated herein by reference.

FIELD

Embodiments of the invention relate to a protection circuit capable of protecting a circuit from electrostatic discharge (ESD) and preventing a malfunction of an internal circuit caused by a drop of output voltage.

BACKGROUND

Various types of protection circuits against Electrostatic Discharge (ESD) are known. ESD may be a discharge from an electrostatically charged human or machine to a semiconductor device, a discharge from a charged semiconductor device to earth, and the like. When the ESD occurs in a semiconductor device, a large amount of electric charge flows as a current from a terminal into the semiconductor device and the charge increases the high voltage inside the semiconductor device, which may result in a dielectric breakdown of the internal devices and a fault of the semiconductor device. Especially, in the case of a semiconductor device for automobile use, the device may be affected by an instant surge caused by an inductive load of a motor or a relay and the like, and therefore, protection of the device against ESD, while maintaining operating voltage to the vehicle components is important.

While, in the case of using a resistor-capacitor (RC) timer power clamp, and the like, as the ESD protection circuit, a shunt transistor turns on, to absorb the charge, thereby lowering the power voltage. According to this, when the operation of the protection circuit lasts for a long time, a malfunction may happen in the internal circuit caused by the drop of the power voltage, or a breakdown may happen in the shunt transistor because of the extended operation of the shunt transistor.

DETAILED DESCRIPTION

In general, according to one embodiment, a protection circuit is provided which protects an internal circuit against an abnormal voltage caused by a surge and, at the same time, avoids malfunctions in the internal circuit caused by a drop of the voltage during the circuit protection operation.

One embodiment provides a protection circuit which comprises a first power terminal to which a voltage at a high potential is applied; a second power terminal to which a voltage at a low potential is applied; a control circuit which is connected between the first and the second power terminals and outputs a control signal when a voltage between the first and the second power terminals exceeds a predetermined value; a shunt transistor with the output current channel thereof connected between the first and the second power terminals and the conductive state thereof controlled according to the control signal; and a asymmetric current transfer device such as a diode, including a PN junction reverse-biased by the voltage between the first and the second power terminals, which is connected in series to the output current path of the shunt transistor.

Hereinafter, a protection circuit according to the embodiments will be described in detail with reference to the attached drawings. These embodiments are not intended to limit the invention.

First Embodiment

Figure 1:
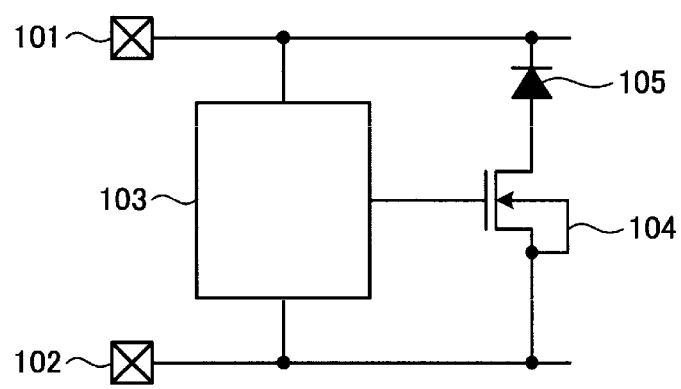
FIG. 1 is a schematic diagram showing a first embodiment.

FIG. 1 is a schematic diagram showing the protection circuit according to a first embodiment. A power voltage at a high potential, for example, 18 V is applied to a first power terminal 101. A power voltage at a low potential, for example, ground potential (0 V) is applied to a second power terminal 102. A control circuit 103 is connected between the first power terminal 101 and the second power terminal 102. When an electrostatic discharge (ESD) is present, a transitional voltage fluctuation occurs in the control circuit 103 due to an electrical surge and the control circuit 103 outputs a control signal when the voltage between the first power terminal 101 and the second power terminal 102 exceeds a predetermined value. A gate electrode of a shunt NMOS transistor 104, which also includes a source electrode and a drain electrode, is connected to the control circuit 103 to receive the control signal from the control circuit 103. The source electrode and a back gate electrode of the shunt NMOS transistor 104 are connected to the second power terminal 102. An asymmetric current transfer device 105, having a PN junction reverse-biased therein, i.e., in a normal state of voltage drop between power terminal 101 and power terminal 102, preventing current flow from power terminal 101 to power terminal 102 therethrough, is connected between the drain electrode of the shunt NMOS transistor 104 and the first power terminal 101. Specifically, the asymmetric current transfer device 105 is connected in series to the output current of the shunt NMOS transistor 104. An internal circuit or load (not shown) is also connected between the first power terminal 101 and the second power terminal 102.

Even when the shunt NMOS transistor 104 turns on according to the control signal from the control circuit 103, a current pathway through the shunt NMOS transistor 104 and the asymmetric current transfer device 105 is not formed unless the voltage between the first power terminal 101 and the second power terminal 102 exceeds a breakdown voltage of the PN junction of the asymmetric current transfer device 105. Therefore, the shunt NMOS transistor 104 does not in that state perform any shunt operation. Accordingly, the voltage value between the first power terminal 101 and the second power terminal 102 never drops to the sum of the breakdown voltage of the PN junction of the asymmetric current transfer device 105 and the voltage between the source and drain of the shunt NMOS transistor 104.

The reverse breakdown voltage (the voltage at which the asymmetry breaks down and current can flow through the asymmetric device, such as a diode, in either direction) of the asymmetric current transfer device 105 is properly set taking the operation voltage or the withstand voltage of the internal circuit (not shown) connected to the first power terminal 101 and the second power terminal 102 into consideration. Specifically, the reverse breakdown voltage of the asymmetric current transfer device 105 is set so that the total sum of its breakdown voltage and the source and drain voltage in the on-state of the shunt NMOS transistor 104 may not exceed the withstand voltage of the internal circuit. For the asymmetric current transfer device 105, for example, a P-type region may be formed within an N-type well region of a semiconductor substrate, and a PN junction of a diode formed between the N-type well region and the P-type region may be used. By adjusting the impurity concentration and the size of each region, the withstand voltage of the PN junction is adjusted and the clamp voltage can be adjusted.

In the case of the internal circuit for automobile use, the operation voltage is, for example, a high voltage of 18 V. According to one embodiment, the voltage at which the ESD circuit will shunt the second power terminal 102 to the first power terminal 101 (ground) is the breakdown voltage of the PN junction of the reverse-biased diode and the voltage between the source and drain of the shunt NMOS transistor 104 in the on-state. As the voltage between the source and drain of the shunt NMOS transistor 104 in the on-state is fairly small compared to the breakdown voltage of the diode, the voltage at which the ESD shunts to ground through the transistor 104 and diode can be adjusted by the breakdown voltage of the diode. Specifically, the voltage to be used for the shunt operation and the voltage to be used for sustaining the shunt operation can be set by the adjustment of the breakdown voltage of the diode of the asymmetric current transfer device 105, which generally may be the breakdown voltage of a single diode. According to the above setting, the state in which the voltage abnormally increases due to the ESD can be avoided by the shunt operation of the shunt NMOS transistor 104 and, at the same time, the situation in which the voltage abnormally drops in the shunt operation for prolonged periods can be avoided by the asymmetric current transfer device 105 and transistor 104 circuit. According to this, it is possible to avoid a malfunction of the internal circuit caused by a drop of the power voltage.

Further, when the voltage is lower than the breakdown voltage of the asymmetric current transfer device 105 and the source to drain voltage of the shunt NMOS transistor 104, a current does not flow in the shunt NMOS transistor 104. Therefore, the situation of current flowing in the shunt NMOS transistor 104 for a prolonged time period can be avoided. According to this, a breakdown of the shunt NMOS transistor 104 can be prevented.

As this embodiment is provided having only one reverse-biased diode connected in series to the output current channel of the shunt NMOS transistor 104, it is possible to minimize an increase in chip area of a semiconductor device with the protection circuit installed thereon, according to the first embodiment.

Figure 2:
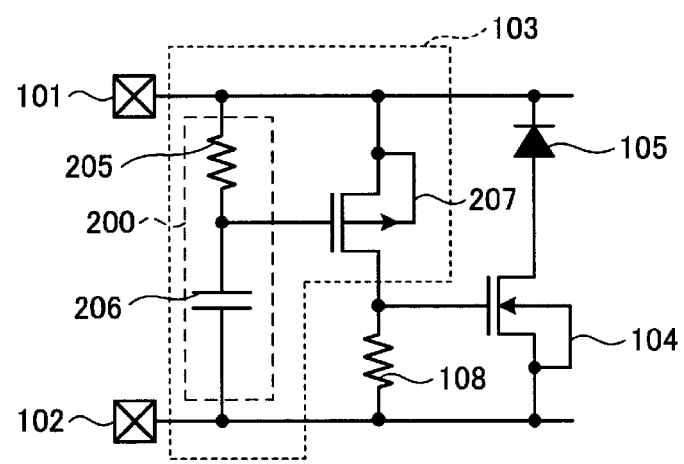
FIG. 2 is a schematic circuit diagram showing the structure according to the first embodiment.

FIG. 2 is a schematic circuit diagram showing a specific example of the protection circuit according to the first embodiment shown in FIG. 1. Identical reference numerals are used with components corresponding to those of FIG. 1 and their description is omitted for brevity. The control circuit 103 includes a bias circuit 200 including a resistor 205 and a capacitor 206 connected between (across) the first power terminal 101 and the second power terminal 102. The control circuit 103 includes a PMOS transistor 207 with its gate electrode connected to the node intermediate of the resistor 205 and the capacitor 206 (i.e., at a node connecting the resistor 205 and the capacitor 206) and the transistor 207 output current channel that is the source and channel connected between the first power terminal 101 and the second power terminal 102. The drain electrode of the PMOS transistor 207 is connected to the second power terminal 102 via a resistor 108.

When a transitional voltage fluctuation happens due to a surge, a voltage between the first power terminal 101 and the second power terminal 102 increases, and a voltage drop in the resistor 205 of the bias circuit 200 exceeds a threshold value of the PMOS transistor 207, the PMOS transistor 207 switches on, to output the drain current. This drain current becomes a control signal to the shunt NMOS transistor 104. When a voltage drop in the resistor 108 exceeds a threshold value of the shunt NMOS transistor 104 according to the drain current of the PMOS transistor 207, the shunt NMOS transistor 104 switches on. Specifically, when the voltage between the power terminals exceeds a predetermined voltage determined by the threshold value of the PMOS transistor 207, the control circuit 103 provides a control signal for controlling the conductive state of the shunt NMOS transistor 104. When the control signal is provided to the gate of the shunt NMOS transistor 104, for example, when the voltage between the first and the second power terminals exceeds the total sum of the breakdown voltage of the asymmetric current transfer device 105 and the voltage between the source and the drain at the on-time of the shunt NMOS transistor 104, a current path formed of the shunt NMOS transistor 104 and the asymmetric current transfer device 105 is formed. Thus, a shunt operation is performed shunting the electrostatic discharge to ground. Even when the voltage drop in the resistor 108 exceeds the threshold value of the shunt NMOS transistor 104, as long as the voltage between the power terminals does not exceed the reverse breakdown voltage of the asymmetric current transfer device 105, the shunt operation is not performed by the shunt NMOS transistor 104, or the shunt operation is terminated.

Second Embodiment

Figure 3:
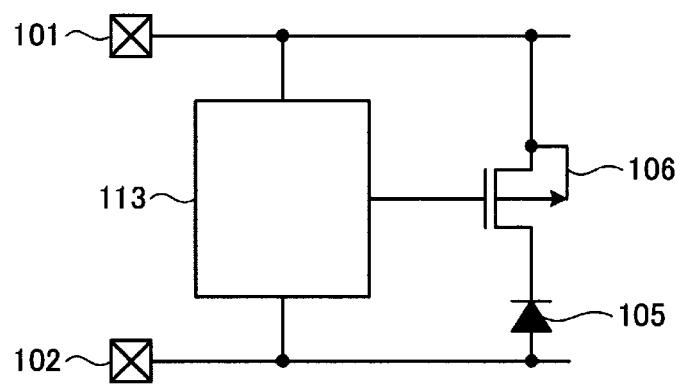
FIG. 3 is a schematic diagram showing a second embodiment.

FIG. 3 is a schematic diagram showing a second embodiment. In this embodiment, a PMOS transistor is used as the shunt transistor. Identical reference numerals are used with devices common to those of the first embodiment and their description is omitted for brevity. A control circuit 113 is connected between the first power terminal 101 and the second power terminal 102. When a voltage between the first power terminal 101 and the second power terminal 102 exceeds a predetermined voltage due to ESD and the like, the control circuit 113 outputs a control signal. The source electrode and the back gate electrode of the shunt PMOS transistor 106 are connected to the first power terminal 101. An asymmetric current transfer device 105 having a reverse-biased PN junction is connected between the drain electrode of the shunt PMOS transistor 106 and the second power terminal 102. Specifically, the asymmetric current transfer device 105 is connected in series to the output current channel of the shunt PMOS transistor 106 connected between the first power terminal 101 and the second power terminal 102. An internal circuit (not shown) is connected between the first and the second power terminals.

When a transitional voltage fluctuation occurs due to a surge and the voltage between the first and the second power terminals increases above the predetermined voltage, the control circuit 113 outputs a control signal. The control signal is supplied to the gate electrode of the shunt PMOS transistor 106. Even when the shunt PMOS transistor 106 is in an on-state according to the control signal, unless the voltage between the first and the second power terminals exceeds a breakdown voltage of the PN junction of the asymmetric current transfer device 105, a current path between terminals 101 and 102 via the shunt PMOS transistor 106 and the asymmetric current transfer device 105 is not formed and therefore, the shunt operation is not performed by the shunt PMOS transistor 106. When the voltage (voltage difference between terminals 101 and 102) exceeds the sum of the breakdown voltage of the asymmetric current transfer device 105 and the voltage between the source and drain of the shunt PMOS transistor 106 when in the on-state, the shunt PMOS transistor 106 performs the shunt operation upon receipt of the control signal from the control circuit 113.

Also in the second embodiment, the abnormal spike of the power voltage due to ESD can be avoided through the shunt operation by the shunt PMOS transistor 106. Since the voltage between the power terminals is the breakdown voltage of the asymmetric current transfer device 105 and the voltage between the source and drain of the shunt PMOS transistor 106 in the on-state, in the shunt operation, the situation in which the voltage abnormally decreases can be prevented from continuing for a prolonged period of time. Thus, a malfunction of the internal circuit can be prevented.

When the voltage across terminals 101 and 102 decreases below the sum of the clamp voltage of the asymmetric current transfer device 105 and the source and drain voltage of the shunt PMOS transistor 106, no current flows in the shunt PMOS transistor 106, thereby preventing the situation of the current flowing in the shunt PMOS transistor 106 for a prolonged period of time. This can prevent a breakdown of the shunt PMOS transistor 106.

Figure 4:
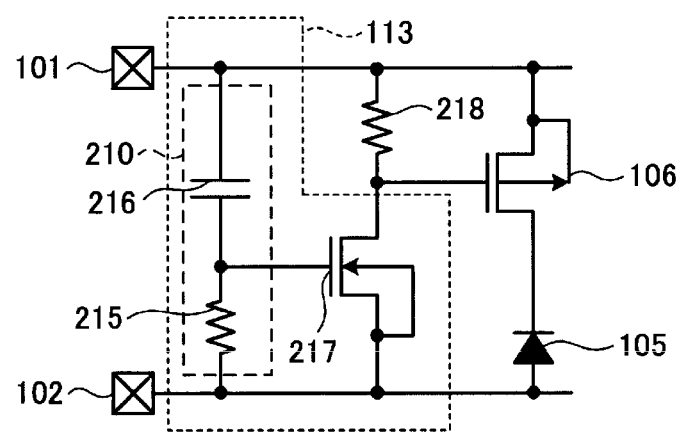
FIG. 4 is a schematic circuit diagram showing the structure according to the second embodiment.

FIG. 4 is a schematic circuit diagram showing a specific example of the protection circuit according to the second embodiment shown in FIG. 3. Identical reference numerals are used with components corresponding to those in FIG. 3 and their description is omitted for brevity. The control circuit 113 has a bias circuit 210 including a capacitor 216 and a resistor 215 connected between the first power terminal 101 and the second power terminal 102. The control circuit 113 has an NMOS transistor 217 with its gate electrode connected to the node of i.e., intermediate, the capacitor 216 and the resistor 215 (node connecting the resistor 215 and the capacitor 216) and its output channels are the source and drain channel connected between the first and the second power terminals. The source electrode and the back gate electrode of the NMOS transistor 217 are connected to the second power terminal 102 and the drain electrode thereof is connected to the first power terminal 101 via the resistor 218.

When a transitional voltage fluctuation occurs due to a surge, and the voltage between the first and the second power terminals increases, a voltage drop in the resistor 215 of the bias circuit 210 exceeds the threshold value of the NMOS transistor 217, the NMOS transistor 217 turns on, to output a drain current. This drain current becomes a control signal to the shunt PMOS transistor 106. When the voltage drop in the resistor 218 exceeds the threshold value of the shunt PMOS transistor 106 according to the drain current of the NMOS transistor 217, the shunt PMOS transistor 106 switches on. Specifically, when the voltage between the power terminals exceeds a predetermined voltage determined by the threshold value of the NMOS transistor 217, the control circuit 113 supplies the control signal for controlling the conductive state of the shunt PMOS transistor 106. Even when the voltage drop in the resistor 218 exceeds the threshold value of the shunt PMOS transistor 106, as long as the voltage between the power terminals is not more than the clamp voltage of the asymmetric current transfer device 105, the shunt operation by the shunt PMOS transistor 106 is not performed, or the shunt operation is terminated.

A Zener diode capable of clamping at a constant voltage can be used as the diode for use of the asymmetric current transfer device. Alternatively, the source, gate, and back gate of the MOS transistor may be connected in common, and the PN junction formed between the common connection and the drain may be used. Further, the base and emitter of a bipolar transistor may be connected in common and the PN junction formed between the common connection and a collector may be used.

A Double-Diffused MOS (DMOS) transistor having a high withstand voltage may be used as the shunt transistor. Further, a bipolar transistor may be used as the shunt transistor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A protection circuit, comprising:
   a first power terminal to receive a high potential voltage;
   a second power terminal to receive a low potential voltage, a circuit to be protected being connected between the first and the second power terminals;
   a control circuit connected between the first and the second power terminals which outputs a control signal when a voltage between the first and the second power terminals exceeds a predetermined threshold value;
   a shunt transistor having a current channel between the first and the second power terminals, the shunt transistor having a conductive state thereof controlled according to the control signal; and
   an asymmetric current transfer device, including a PN junction reverse-biased by a power voltage between the first and the second power terminals, the current channel of the shunt transistor and the asymmetric current transfer device being connected in series between the first and the second power terminals and in parallel to the circuit.

2. The circuit according to claim 1, wherein the PN junction of the asymmetric current transfer device is a PN junction of a diode.

3. The circuit according to claim 1, wherein:
   the shunt transistor is an NMOS transistor, and
   the asymmetric current transfer device is connected between a drain electrode of the NMOS transistor and the first power terminal.

4. The circuit according to claim 3, wherein the PN junction of the asymmetric current transfer device is a PN junction of a diode.

5. The circuit according to claim 1, wherein:
   the shunt transistor is a PMOS transistor, and
   the asymmetric current transfer device is connected between a drain electrode of the PMOS transistor and the second power terminal.

6. The circuit according to claim 5, wherein the PN junction of the asymmetric current transfer device is a PN junction of a diode.

7. The circuit according to claim 1, wherein the control circuit comprises:
   a bias circuit formed by a series circuit including a resistor and a capacitor connected between the first and the second power terminals, and a MOS transistor with a gate electrode thereof connected between the resistor and the capacitor and having a current channel thereof between the first and the second power terminals, from which the control signal is output.

8. The circuit according to claim 7, wherein the PN junction of the asymmetric current transfer device is a PN junction of a diode.

9. The circuit according to claim 7, wherein:
the shunt transistor is an NMOS transistor, and
the asymmetric current transfer device is connected between a drain electrode of the NMOS transistor and the first power terminal.

10. The circuit according to claim 9, wherein the PN junction of the asymmetric current transfer device is a PN junction of a diode.

11. The circuit according to claim 7, wherein:
the shunt transistor is a PMOS transistor, and
the asymmetric current transfer device is connected between a drain electrode of the PMOS transistor and the second power terminal.

12. The circuit according to claim 11, wherein the PN junction of the asymmetric current transfer device is a PN junction of a diode.

13. A protection circuit, comprising:
a first power terminal;
a second power terminal, a circuit to be protected being connected between the first and the second power terminals;
a control circuit connected between the first and the second power terminals which outputs a control signal when a voltage between the first and the second power terminals exceeds a predetermined threshold value;
a shunt transistor having a current channel between the first and the second power terminals; and
a diode connected to the current channel of the shunt transistor, the current channel of the shunt transistor and the diode being connected in series between the first and the second power terminals and in parallel to the circuit, the diode being reverse-biased by a power voltage between the first and the second power terminals.

14. The circuit according to claim 13, wherein the diode includes a PN junction.

15. The circuit according to claim 14, wherein:
the shunt transistor is an NMOS transistor, and
an anode of the diode is connected to the NMOS transistor and a cathode of the diode is connected to the first power terminal.

16. The circuit according to claim 14, wherein:
the shunt transistor is a PMOS transistor, and
a cathode of the diode is connected to the PMOS transistor and an anode of the diode is connected to the second power terminal.

17. A method for protecting a circuit, comprising:
monitoring a power voltage value between a first power terminal and a second power terminal, a circuit to be protected being connected between the first and the second power terminals;
outputting a control signal when the power voltage value between the first and the second power terminals exceeds a predetermined threshold value;
leading a current from the first power terminal to the second power terminal through a current channel of a shunt transistor and an asymmetric current transfer device that are connected in series between the first and the second power terminals and in parallel to the circuit, based on the control signal when the power voltage value between the first and the second power terminals exceeds a breakdown voltage of the asymmetric current transfer device.

18. The method of claim 17, wherein:
the shunt transistor is an NMOS transistor, and
the asymmetric current transfer device is connected between a drain electrode of the NMOS transistor and the first power terminal.

19. The method of claim 17, wherein:
the shunt transistor is a PMOS transistor, and
the asymmetric current transfer device is connected between a drain electrode of the PMOS transistor and the second power terminal.

* * * * *